July 6, 1954  N. RYNN ET AL  2,683,187
METHOD OF AND MEANS FOR TESTING COLOR TELEVISION APPARATUS
Filed Feb. 28, 1951  2 Sheets-Sheet 1
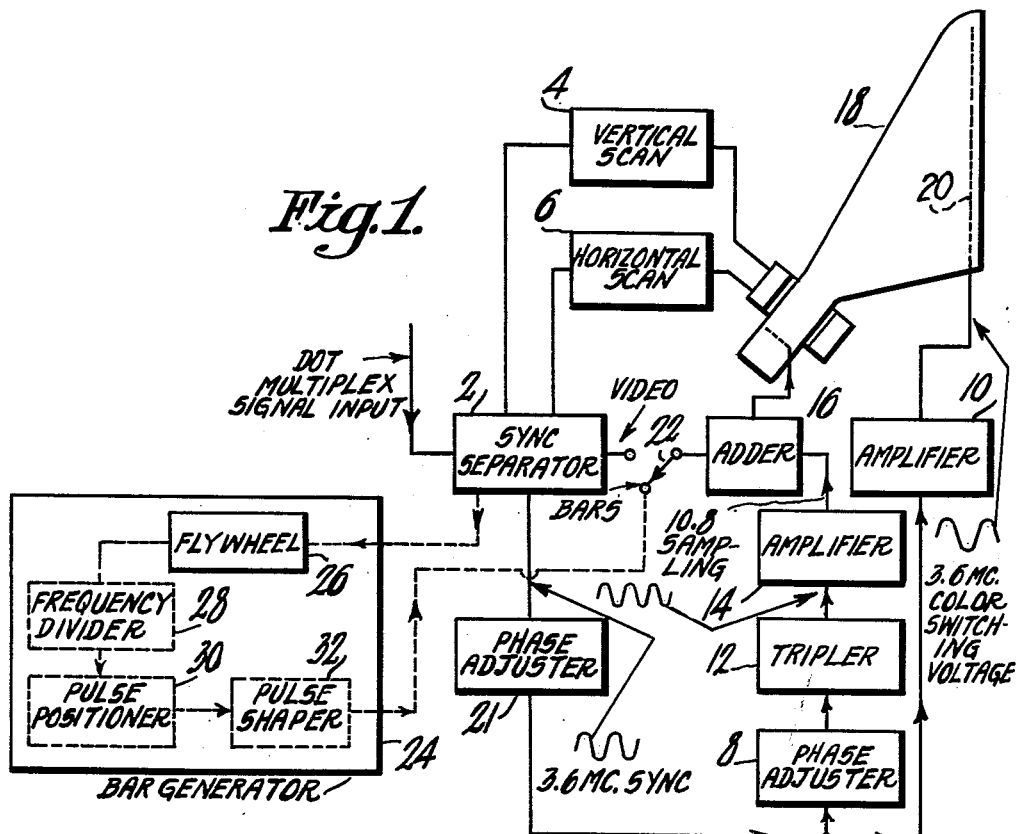
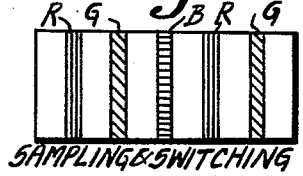
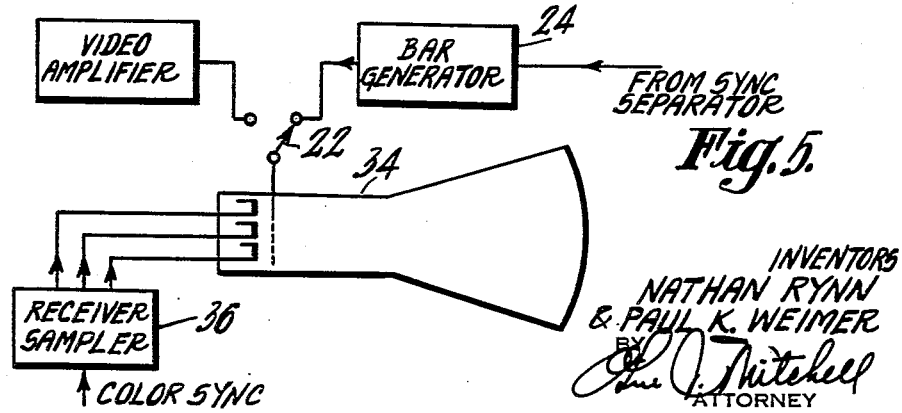
INVENTORS
NATHAN RYNN
& PAUL K. WEIMER July 6, 1954     N. RYNN ET AL     2,683,187
METHOD OF AND MEANS FOR TESTING COLOR TELEVISION APPARATUS
Filed Feb. 28, 1951     2 Sheets-Sheet 2
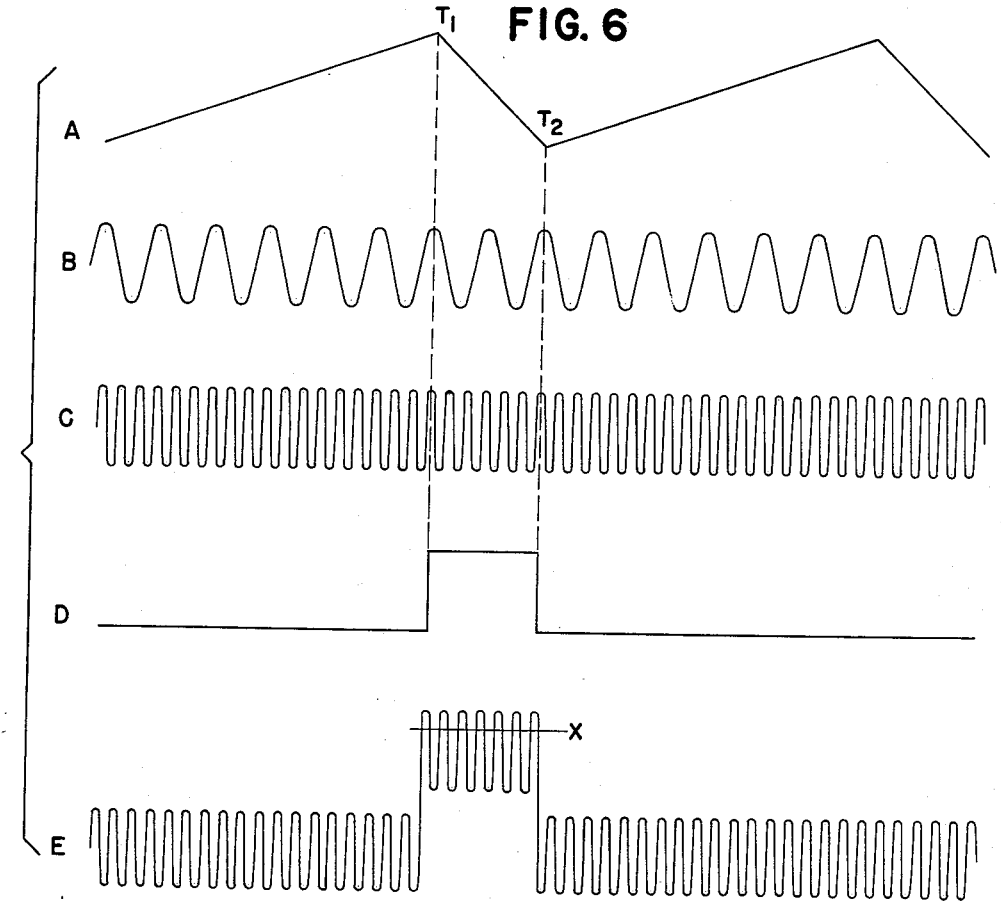
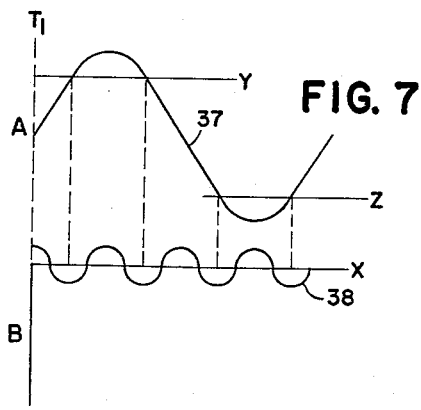
INVENTOR
NATHAN RYNN and
PAUL K. WEIMER
BY
ATTORNEY

Patented July 6, 1954

2,683,187

UNITED STATES PATENT OFFICE 2,683,187

METHOD OF AND MEANS FOR TESTING COLOR TELEVISION APPARATUS

Nathan Rynn and Paul K. Weimer, Princeton, N. J., assignors to Radio Corporation of America, a corporation of Delaware Application February 28, 1951, Serial No. 213,212

The terminal fifteen years of the term of the patent to be granted has been disclaimed 5 Claims. (Cl. 178—5.4)

This invention relates to a method of and means for testing the operation and performance of color television apparatus.

In order that television equipment will reproduce images in their true colors it is necessary that the color image tube or tubes and their associated circuits perform properly and accurately and that they be adjusted for optimum performance.

It is an object of this invention to provide a relatively simple method of and means for the rapid, visual and accurate checking of color image tubes and their associated circuits.

Another object of the invention is to provide a method of and means for presenting on the face of an image tube, a pattern, either in monochrome or in a sequence of colors which is indicative of the operation of the tube and its associated circuits.

In accordance with the invention a vertical bar test pattern is caused to appear on the face of the image tube by applying the test signal only during the fly-back time of the horizontal deflection. By using only the fly-back time, it is possible to obtain magnification of the sweep. Every other scanning line is blanked out to eliminate the dot interlace and to produce the uniform vertical bars.

Other objects and advantages of the invention will become apparent upon a consideration of the following detailed description taken in conjunction with the accompanying drawings in which:

Fig. 1 represents in block diagram an embodiment of the invention as applied to a particular color televsion receiving system;

Fig. 2 represents one pattern produced by the use of the invention;

Fig. 3 represents another pattern produced by the use of the invention;

Fig. 4 represents a third pattern produced by the use of the invention; and,

Fig. 5 represents a modification of the invention as applied to a color tube of a different type.

Fig. 6 represents various wave forms taken from points in the circuit of Fig. 1. Fig. 7 represents some of the wave forms of Fig. 6 enlarged to more accurately show the phase relationship.

For purposes of simplicity, the invention will be described as applied to a color system of the dot-multiplex type using a single gun color image tube in which the particular color phosphor energized is dependent upon a switching voltage applied to the color kinescope. Extrapolation to the testing of other color image reproducing systems such as multi-gun or multi-tube systems or to direction sensitive color tubes is quite straightforward and the application of the invention to such systems will be clear from the principles described below. It will also be clear that the benefits of the invention are equally applicable and may readily be used with color television systems other than dot-multiplex. Accordingly, it is to be understood that the invention is not intended to be limited to the particular system and apparatus chosen for purposes of illustration.

The particular apparatus chosen for purposes of illustration is shown in Fig. 1. Referring to that figure, it will be seen that in normal reception of color signals the composite dot multiplex signal is fed to a sync separator 2. There the normal vertical and horizontal synchronizing pulses are separated out and applied to the vertical scanning circuits 4 and horizontal scanning circuits 6, respectively, the horizontal deflection voltage being graphically shown in Fig. 6A. Color phasing signals in the form of a sine wave of 3.6 megacycle frequency are also separated out and are then fed to a phase adjuster 8, and an amplifier 10, this voltage wave form is indicated in Fig. 6B amplified relative to 6A. From the phase adjuster 8 the 3.6 megacycle signals are fed to a frequency tripler 12 to derive a sine wave of 10.8 megacycle frequency. The 10.8 megacycle wave, shown in Fig. 6C amplified in relation to 6A, is then fed to an amplifier 14 where it is combined with the video signals by an adder 16 and are fed to the control grid of the gun of the 45° color tube 18. In order to cause activation of the proper phosphors of the screen 20 of the color tube at the proper time and in the proper sequence, the 3.6 megacycle wave from amplifier 10 is applied to the elements of the screen 20 of the tube. Phase adjuster 21 is included in the sync circuit to provide additional control.

The 10.8 megacycle wave is adjusted in phase with phase adjuster 8 and 21 so that the incoming video signals are sampled at the dot repetition rate of the incoming signals and the samples utilized to control the intensity of the cathode ray beam. By means of the 3.6 megacycle wave the beam is caused to strike the proper phosphor element to cause the screen to emit the color corresponding to the color signal being transmitted. The color light produced is dependent upon the potential applied to electrode 20.

In order to accomplish the objects of the invention, a switch 22 is provided to remove the video signals fed to the adder 16 and substitute therefore signals from the apparatus within the box 24. This appearance may be called a bar generator.

If the dot pattern of the dot-multiplex system of color television were magnified in the absence of a video signal or in the presence of a steady direct current signal, it would be seen as a crawling checkerboard pattern seen on a black and white monitor of the color signal. This pattern results from the use of dot interlacing. In accordance with the present invention, in one of its forms every other line in time sequence is blanked out. As a result, the crawling feature of the pattern is eliminated and the dots lie along vertical and horizontal lines. Now by applying magnification in a horizontal direction only the resulting pattern appears as a series of easily visible vertical lines across the image tube screen.

The above is accomplished in accordance with the invention by removing the usual video signal and unblanking the grid of the image reproducing tube only during horizontal fly-back time of alternate lines. That is the image reproducing tube is energized only during the flyback time of alternate lines.

The horizontal synchronizing signals are supplied to what might be termed a flywheel circuit 26. This flywheel circuit preferably consists of an oscillator which is locked in frequency by the synchronizing signals to the horizontal scanning frequency. The output of the flywheel circuit is fed to a frequency divider 28 to produce a wave having a frequency of one-half the horizontal line frequency. The resulting wave is fed to a multivibrator type pulse positioner 30 which produces pulses having the desired position in time. The pulses are then passed through suitable circuitry 32 to give the pulses the desired shape and width, as shown in Fig. 6D. The pulses thus produced are fed to the image tube 18 after being combined with the 10.8 mc. voltage in the adder circuit 16 to give the resultant wave form shown in Fig. 6E. The adder circuit may, for example, take the form of a conventional mixer and be used to unblank the grid of the tube as explained above when a predetermined amplitude as indicated by line $x$ in Fig. 6E is reached.

Referring now to Fig. 7A the line 37 represents the voltage applied to the grid 20 of the tube. All voltages having a voltage equal to or greater than the amplitude represented by the line $y$ will cause the tube to fluoresce at one color upon bombardment by the cathode ray beam. Similarly, all voltages equal to or less than the voltage represented by the line $z$ will cause the tube to fluoresce at a different color upon bombardment by the cathode ray beam. Voltages applied to the grid 20 intermediate the lines $y$ and $z$ will cause the cathode ray beam to activate still another color phosphor. Thus, with continuous bombardment, and the application of a voltage such as represented by curve 37, all three colors would be activated.

In order to produce the desired bar pattern, the control grid is blocked and unblocked at intervals by the resultant voltage provided by amplifier 14, the bar generator 24, as shown in Fig. 6C and D, an amplified version of which is represented in Fig. 7B. Here, the line $x$ represents the voltage at or above which the control grid becomes unblanked and the line 38 represents the applied voltage. A consideration of curves 7A and B will make it clear that the grid is unblanked for a short period during each color period.

All of these components and their circuitry are well known in the art and no detailed description thereof is believed necessary. Details regarding these components may be found in textbooks on electronics such as "Radio Engineers Handbook" by Terman or recent publications on dot multiplex color television such as RCA Bulletins on Color Television and U. H. F. October 1949 to July 1950 published by Radio Corporation of America. The synchronizing signals could be used to synchronize a half frequency oscillator directly and the frequency divider network be eliminated. It is also possible to combine the pulse positioner and the pulse shaper.

When using no color switching but using sampling as outlined above, the reproduced pattern would appear as illustrated in Figure 2 as a series of straight vertical lines of a single color with blank spaces between each color bar. Measurement of the width of the lines, their linearity, color purity, uniformity and equality of spacing, and the like will give information concerning the sampling apparatus and the operation of the sampling circuits. A series of such tests can be easily made using each color phosphor to give a complete picture of the operation of the associated circuitry.

By turning up the gain of amplifier 10 color switching may be done. By turning down the gain of amplifier 14 sampling may be eliminated. By utilizing sine wave color switching, without sampling the pattern appears as shown in Figure 3. In Figure 3 sequentially colored solid vertical bars will appear with no blank or black spaces between them. This pattern yields information about the functioning of the switching circuit, the uniformity and regularity with which the phosphors were laid down in their patterns in the image reproducing tube, and on the regularity of mechanical construction of the image tube.

With both sampling and color switching, vertical colored lines, red, green, blue in sequence will appear separated by black spaces. Since the color sequence is determined by the sampler phase shifter, a visual picture of its operation is thus obtained. Inspection of the chromaticity indicates the adequacy of the switching and sampling circuits and of the phosphors.

Although the above indications were arrived at utilizing horizontal magnification alone vertical magnification may also be employed. The pattern would then appear as a dot pattern laid out in grille.

The application of this testing arrangement to color receiving tubes of the type in which the color generated is dependent upon the approach angle of the cathode ray beam is shown in Figure 5.

Typical tubes of this sort are shown and described in the paper entitled "General Description of Receivers for the RCA Color Television System Which Employ the RCA Direct-View Tri-Color Kinescopes" published in April 1950 by the Radio Corporation of America. The color tube 34 there illustrated is of the three beam type although a single beam whose angle of approach is cyclically changed could be used in place of the three beam type. The operating circuits therefor are of the usual type and therefore have not been illustrated. Detail of associated circuitry is illustrated in the paper referred to immediately above. The bar generator 24 of the invention is keyed by the sync signals and the output thereof applied to the grid of the color tube as in the modification shown in Figure 1. The receiver sampler 36 keys the cathodes of the color tube in desired sequence.

The operation of this arrangement is essentially the same as that for the arrangement shown in Figure 1 with the exception of the fact that the term "color switching" no longer properly applies since the problem here is to get the proper sampling width only. It is also possible to obtain information indicating the uniformity of the registration and convergence of the three guns by using the procedures described above.

What is claimed is:

1. Apparatus for testing television equipment in a system of the type wherein there is employed a scanning cathode ray beam image reproducing device having a scanning cathode ray beam control electrode and a scanning sequence involving a normally active scanning beam time occupied by a scanning line and a normally inactive scanning beam flyback time, means for inactivating said scanning beam during said normally active scanning beam time occupied by a scanning line and activating said scanning beam during said normally inactive scanning beam flyback time, a bar pattern generator having a signal output circuit and means connecting said bar pattern generator signal output circuit to said scanning cathode ray beam control electrode.

2. Apparatus for testing television equipment in a system of the type wherein there is employed a scanning cathode ray beam image reproducing device having a scanning cathode ray beam control electrode and a scanning sequence involving a normally active scanning beam time occupied by a scanning line and a normally inactive scanning beam flyback time, means for inactivating said scanning beam during said normally active scanning beam time occupied by a scanning line and activating said scanning beam only during the time interval occupied by alternate flyback line positions, a bar pattern generator having a signal output circuit and means connecting said bar pattern generator signal output circuit to said scanning cathode ray beam control electrode.

3. Apparatus for testing color television equipment in a system of the type employing color detection means and wherein there is employed a scanning cathode ray beam image reproducing device having color control means, a scanning cathode ray beam control electrode and wherein said image reproducing device employs a scanning sequence involving a normally active scanning beam time occupied by a scanning line and a normally inactive scanning beam flyback time, means for inactivating said scanning beam during said normally active scanning beam time occupied by a scanning line and activating said scanning beam only during the time interval occupied by alternate flyback line positions, a bar pattern generator having a signal output circuit and means connecting said bar pattern generator signal output circuit to said scanning cathode ray beam control electrode.

4. The invention as set forth in claim 3 and wherein there is provided means for inactivating said color detection means during test.

5. The invention as set forth in claim 3 and wherein there is provided means for inactivating said color control means during test.

References Cited in the file of this patent

UNITED STATES PATENTS

| Number | Name | Date |
|---|---|---|
| 2,292,045 | Burnett | Aug. 4, 1942 |

FOREIGN PATENTS

| Number | Country | Date |
|---|---|---|
| 520,349 | Great Britain | Apr. 22, 1940 |

OTHER REFERENCES

Duke, "A Method and Equipment for Checking Television Scanning Linearity," RCA Review, vol. VI, #2, October 1941.